Jan. 9, 1962 T. F. McINTYRE ETAL 3,015,981
CLARINETS
Filed Sept. 9, 1958 6 Sheets-Sheet 1

INVENTORS
Thomas F. McIntyre and
Robert J. McIntyre
BY
Brown & Seward
Their ATTORNEYS

Jan. 9, 1962 T. F. McINTYRE ETAL 3,015,981
CLARINETS
Filed Sept. 9, 1958 6 Sheets-Sheet 3

INVENTORS
Thomas F. McIntyre
and Robert J. McIntyre
BY
their ATTORNEYS

Jan. 9, 1962 T. F. McINTYRE ETAL 3,015,981
CLARINETS
Filed Sept. 9, 1958 6 Sheets-Sheet 4

INVENTORS
Thomas F. McIntyre
and Robert J. McIntyre
BY Brown & Seward
THEIR ATTORNEYS Jan. 9, 1962 T. F. McINTYRE ETAL 3,015,981
CLARINETS
Filed Sept. 9, 1958 6 Sheets-Sheet 5

Fig. 23

INVENTORS
Thomas F. McIntyre
and Robert J. McIntyre
BY
their ATTORNEYS

3,015,981
CLARINETS
Thomas F. McIntyre and Robert J. McIntyre, both of Elm St., Thomaston, Conn.
Filed Sept. 9, 1958, Ser. No. 759,966
12 Claims. (Cl. 84—382)

This invention relates to a new and useful key mechanism for clarinets, that simplifies the playing of the instrument, by eliminating many of the difficulties in fingering, which are inherent in the present system.

For example, our system hereinafter referred to as The McIntyre system of keying eliminates the keys of the "throat tones," G♯, A and B flat, found on all former clarinet systems. However, elimination of said keys does not eliminate the "throat tones" which have, in the standard system, been provided by placing the fingers on these tone holes. The playing of these tones on clarinets constructed according to our invention will be set forth in detail below.

The G♯ (2nd line of staff) on the McIntyre system is played with the 4th finger, left hand, only, from the 3rd finger ring key around a raised finger hole.

The A (2nd space of staff) is played with either the 3rd (middle finger) left hand, only, or the 3rd and 4th fingers left hand. With the G♯ and A fingers depressed the sound A is produced.

The B♭ (3rd line of staff) is played with the A (middle finger left hand) and the 2nd or index finger left hand depressed together. The B♭ may also be played by depressing the 2nd, 3rd, and 4th fingers together.

The F (thumb trill) first space of staff to G, second line of staff, is now played by a new key located on the right hand side of the instrument. This is normally played from the G♯ side key on the standard clarinet, which key, as noted above, has been removed in the McIntyre system.

As a result of the simplified fingerings, through elimination of the usual G♯–A–B♭ keys, it is now possible for the beginner to learn more rapidly, and, it also allows the professional to play passages with ease which heretofore required constant practice. Furthermore, the rapidity with which the clarinet may be fingered, as a result of allowing the fingers to remain in a normal playing position at all times, will permit more difficult music to be written for the instrument.

Because the B flat hole is large on the McIntyre system clarinet, the B flat tone is always rich and powerful, as compared to a weak sound when the small speaker key is used on the standard clarinet. This B flat is used at all times on the McIntyre system.

The object of our invention is to provide a clarinet with a new key mechanism whereby the above and other innovations may effectively be carried out as will appear from the explanation of the mechanisms now to be described generally with respect to the operation of same.

Action

The complete invention of the McIntyre system is found on the top or upper section of the clarinet and the keys are normally either open or closed as follows:

Normally open or raised are G♯ ring key 1, the A ring key 11, B♭ or F♯ ring key 20, F♯ pad key 68, the D pad key 44. Normally closed are G♯ pad key 51, A pad key 56, B♭ pad key 61. With respect to the standard keys on the left hand side the B♭ side key and the speaker register key are normally closed.

On the right hand side the B♭ side key and the F♯ side key are closed. The new F trill key which is unique in McIntyre's structure is normally closed.

A raised tone hole 101, conventionally known as the D tone hole, has been provided on the 3rd finger hole to accommodate the new G♯ finger ring 1 key assembly, thus allowing an "air tight" covering by the 4th finger left hand.

The spring action of the A pad key 56 on the clarinet has been reversed from that of the standard system by the addition of a needle spring 60, whereby the normal position of applicants' A pad key 56 is closed. The A ring 11 key assembly, and a connection 46 from the D pad key 44, are held in a normal raised position by means of a needle spring 150 acting on hook 26. The heavier spring action on the A ring key 11 holds the A pad key 56 in a closed normal position thru rocker mechanism 75 and extension 9. When the A ring key 11 is depressed, the A pad key 56 opens, due to the reverse spring action of the lighter spring on the pad A key 56 and a free action of the A rocker 75.

When it is necessary for the A pad key 56 to remain closed, even though the A ring key 11 is depressed, a key operated from the thumb, or F hole, provides a holding down action to the A rocker 75. A bar 8, extending from the holding bar 9 of the A ring key 11, to beneath the holding down bar 7 of the G♯ ring key 1, lifts the G♯ ring key 1, allowing the G♯ pad key 51 to open with the A pad key 56, to produce the sound A.

The G♯ key 1 assembly operates in the same manner as the A key 11 assembly. The normal closed position of the G♯ ring key 1 has been reversed to normal open by means of a needle spring 34 and hook 6. The new G♯ finger ring key 1, from the 3rd finger hole, holds the G♯ pad key 51 in a closed position when not in use. When the 3rd finger ring key G♯ 1 is depressed, an extending bar 4, back to the G♯ rocker 74 allows the G♯ pad key 51 to open, thus enabling the player to play G♯ from the 3rd finger hole 101. When it is necessary for the G♯ pad key 51 to remain closed, even though the 3rd finger ring key (G♯ 1) is depressed, a key operated from the thumb, or F hole provides a "holding down" action to the rocker 74.

The D key pad 44 assembly only may be operated from the right hand, when it becomes necessary to play the "fork" B♭ or E♭ which is standard on all Boehm system clarinets. Without our split key action, the "fork" B flat and E flat would not be playable because it is a direct connection from the new A ring key 11 from the 2nd finger hole 102 conventionally known as the E tone hole, and, the A pad key 56 would open when it should remain closed for these 2 important notes—fork B flat and E flat.

The B flat tone is played from the F♯ (1st hole 103, conventionally known as the F tone hole), with the A finger ring 11 (2nd hole) depressed. The action of the B flat pad key 61 is also constructed on a reverse spring arrangement (comparable to A ring key and G♯ ring key above). In a normal open position of the F♯ ring key 20 the B♭ rocker 76 holds the B♭ pad key 61 in a closed position. When the F♯ ring key 20 is depressed, with the A ring key 11, the B flat pad key 61 opens, due to the free action of the B flat rocker 76, plus the heavy spring 78 of the F♯ ring key 20 working against the lighter spring 65 of the B flat pad key 61.

When it is necessary for the B flat pad key 61 to remain closed, even though the F♯ ring key 20 is depressed, a holding down bar 57 from the A pad key 56, over the B flat pad key 61, provides a holding down action.

The thumb holding down rocker key 81 is operated from the F thumb ring key. When this F thumb ring key is depressed, it immediately lifts a rocker key, and provides a holding down on the back of the G♯ and A pad keys 51 and 56, thus allowing the said keys to remain closed when the first, second and third finger rings (F♯, A and G♯ ring keys) are depressed.

Because of the delicate operation of this mechanism, and the many notes that the 1st, 2nd, and 3rd ring keys (F#, A and G# ring keys) will play a "bounce" or "bubble" i.e. an extra tone not desired is sometimes produced on various notes, due to the rapid fingering of the instrument from one note to another. In order to eliminate this situation, the rocker mechanism has been designed to allow a slight "pick up" i.e., lost motion or "play" on the B flat rocker 76. For example, when playing from F# (1st hole, the conventional F tone hole only) to A (2nd hole, the conventional E tone hole only), the fingers move so rapidly as to cause the B flat pad key 61 to move slightly when the reverse spring action of the B flat ring key 20 is released. The "delay" or "pickup" movement on the B flat rocker erases this situation.

Also, the F# ring key 20 has been "split" and separated so that the F pad key may be independently operated with respect to the F# ring key so as to operate independently with either the F thumb key, or with the F# pad key 68. This eliminates movement of the B flat pad key 61 when the notes A to F (thumb key) are desired.

The F trill key, new with applicants (109, FIG. 1), is constructed on the right hand side of the clarinet. It is the highest of the 3 side keys, and it is held down in a normal closed position by means of a flat spring 110. It is depressed with the index finger of the right hand when the F to G trill is required.

"Fork" means the right hand index finger is down i.e. on the lower section and the left hand index finger is down on the upper section.

A practical embodiment of our invention is illustrated in the accompanying drawings in which the parts are identified by the same numerals in the several figures. It will be understood that the clarinet body per se is similar to that of the standard instrument and comprises the mouthpiece 118, upper section and lower section 119.

Referring to the drawings.

It should be borne in mind that we have not made changes in the mouthpiece or on the lower body section of the standard instrument and the following description will therefore be restricted to the section known as the upper or top section of the standard clarinet.

On this upper section 30 we have arranged the appropriate holes; our "top stack" of keys; our "lower stack" of keys; our "rocker" mechanism; plus the new F trill key and the following standard keys, i.e.; "speaker" key; B flat (A#) side pad key; B flat or A#, and D# or Eb the latter being the same keys; also the second key used with the right side key (which plays F# with the thumb depressed); C# (or G#) side key; and thumb key.

The top stack

The McIntyre "top stack" comprises the G#, A, and B flat ring key 1, 11, 20 mechanisms, it being understood that these three ring keys may also be used to produce other sounds. For example: The B flat ring key 20 is also F#; B flat plus A, plus thumb gives low D or high A, with the "register" or "speaker" key; F# (B flat key) plus A, plus G#, plus thumb gives low C or high G with the "register" or "speaker" key. "Register" or "speaker" key as used herein denote the usual keys so designated by these terms on the standard instrument.

The G# ring key (FIG. 4) consists of the ring 1, arm 2, longitudinal 3 fixed at right angles to arm 2, and terminating in a cross arm or extension bar 4. Arm 4 carries at one end a short tube 5 provided with a spring hook 6, and, adjacent the other end of arm 4 is a short leg 7 arranged to coact with a similar short leg 8 on the A ring key extension bar 9. Fixed on the arm 2, between the ring 1 and the longitudinal 2 is a short tube 10, the function of which will be stated below.

The A ring key (FIG. 5), consists of the ring 11, arm 12, tube 13 and the longitudinal elements 14, 15, 16, and 17, the latter carrying the extension bar 9 and its leg 8.

Figures 4, 5, 7:
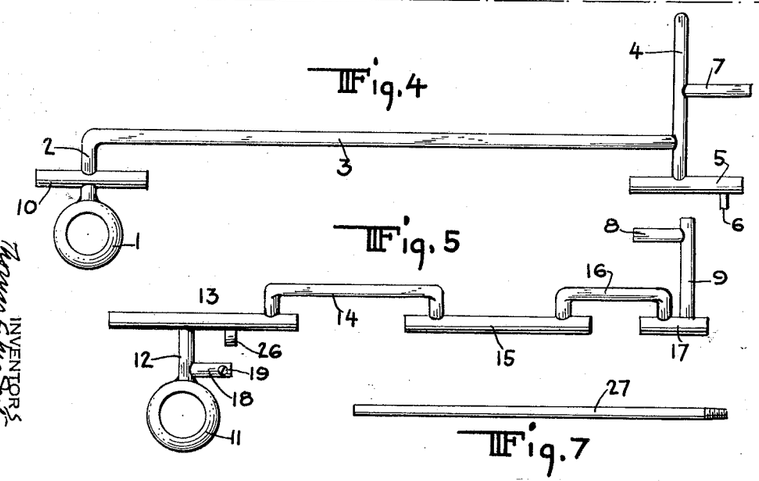
FIG. 4 represents, in detail, the G# ring key.
FIG. 5 represents, in detail, the A ring key.
FIGS. 7 and 8 represent elements for operatively holding these keys of the "top stack" in operative relationship.

It will be noted here that longitudinal elements 13, 15 and 17 are tubular and element 13 carries spring hook 26. Arm 12 carries a short bar or leg 18, tapped adjacent its outer end to receive an adjustable member such as a screw 19 which is movable through leg 18.

The B flat ring key (FIG. 6) comprises the ring 20, its arm 21, longitudinal tube 22, and its right angled extension bar 23. Arm 21 carries a short right angled leg 24, tapped adjacent its outer end to receive an adjustable member or screw 25.

Figure 6:
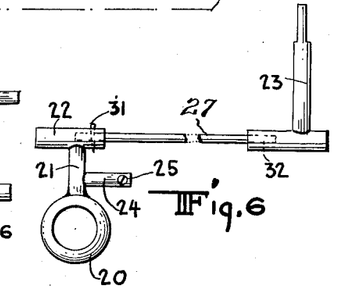
FIG. 6 represents in detail, the B flat (or F#) ring key.
Figure 8:
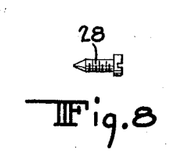

The short screw 25 is adjustable toward and away from an extension 26 of the F# pad key 68 to contact same and adjust the relative movement of the leg 24 and said extension 26.

The G# ring 1 key is mounted in the top sections 36 and 37 of posts 112, 113, 114 based on the instrument body section 30 by means of a long screw 35 which is screwed into post section 36, the other end of said screw 35 being supported in said section 37. This screw passes through the tubular section 10 to rockably support same thereon, the other section 5 of this key 1, being rockably supported on the long rod 27. The latter is pinned by a taper pin 31 to section 22, and soldered at 32 (see FIG. 2).

The A ring key 11 is rockably mounted on screw 35 which passes through section 13 thereon and is also rockably supported on rod 27 which engages sections 15 and 17 of this key. It will be noted the A ring key extension bar 9 is so located as to bring the leg 8 under the leg 7 of the G# ring key extension bar 4.

The B flat ring key 20 is rockably mounted at one end on a pivot screw 28 in a top post section 29 which engages one end of element 22, the other end of this element being supported on the extreme threaded end of screw 35 passed through post section 36.

Figure 2:
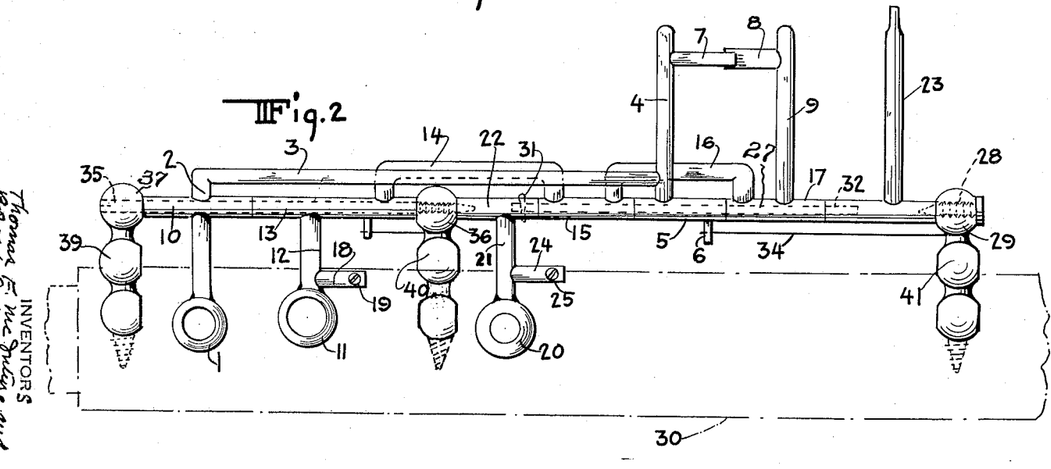
FIG. 2 represents a layout of the top key "stack," as we refer to it, illustrating the keys arranged according to the invention, i.e., the "top stack" assembly.

The mounting of these three ring keys G#, A and B flat (1, 11 and 20) permits each to be operated independently of the others i.e., rocked on rod 27 and screw 35, by manipulating the rings 1, 11 or 20 as desired, and their assembly is illustrated in FIG. 2.

The lower stack

The McIntyre "lower stack," includes keys which are operated with and partially controlled by the "upper stack" keys.

The "lower stack" is mounted beneath the "upper stack" and comprises the following pad keys, to wit; D 44, E or F# 68, G# 51, A 56 and B flat 61.

Figure 3:
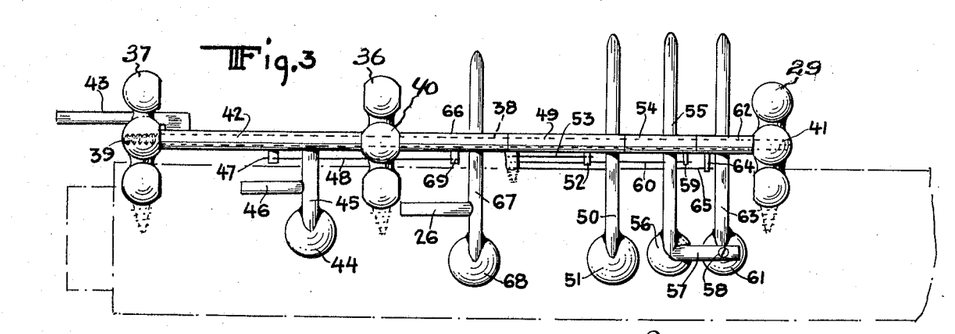
FIG. 3 represents a layout of the lower key section, or lower "stack" as we term it, showing the "lower stack" assembly of keys, also located on the upper section.
Figure 22:
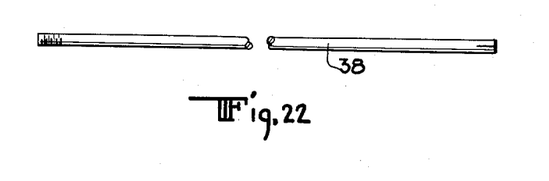
FIG. 22 represents the long screw for holding the parts illustrated in FIGS. 17, 18, 19, 20, and 21 in operative relationship.

All of these keys are rockably mounted on the same long screw 38, shown in FIG. 22, which is supported in post sections 39, 40, 41 as shown in FIG. 3.

Figure 17:
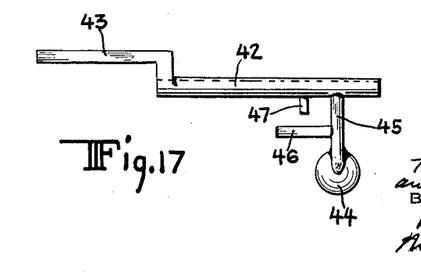
FIG. 17 represents the D pad key.

The D pad key 44 (FIG. 17) comprises a longitudinal 42, mounted on screw 38, said longitudinal having an offset section 43 at one end, and having the pad key 44 on arm 45 adjacent its other end. An adjusting bar 46 extends at right angles to arm 45 for operative contact with screw 19 in arm 18 of the A ring key 11 and a spring hook 47 is carried by the longitudinal 42 to operatively engage needle spring 48 in the usual manner for returning the released key to its initial position.

Figure 18:
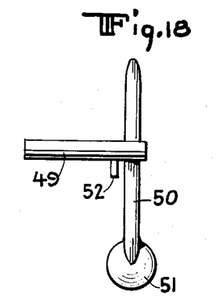
FIG. 18 represents the G# pad key.

The G# pad key (FIG. 18) comprises a longitudinal 49, and cross arm 50, the latter terminating in pad key 51. The usual spring hook 52 is mounted on longitudinal 49 for operative engagement with the usual needle spring 53. Screw 38 passes through longitudinal 49 to rockably support same thereon.

Figure 19:
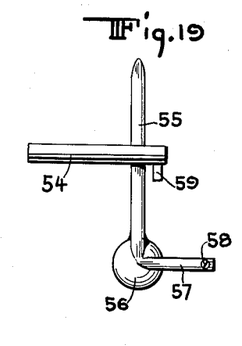
FIG. 19 represents the A pad key.

The A pad key (FIG. 19) consists of the longitudinal 54 carrying adjacent one end the cross arm 55 which supports the pad key 56, and, at the same end thereof, the adjusting or holding down bar 57. The latter is tapped to receive screw 58 which is adjustable toward and away from the B flat pad key, denoted by 61. The longitudinal 54 also has a spring hook 59 fixed thereon for coaction with needle spring 60 in the usual manner. Screw 38 passes through the longitudinal 54 and rockably supports same thereon.

Figure 20:
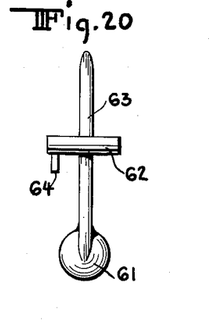
FIG. 20 represents the B flat pad key.

The B flat pad key (FIG. 20) includes the longitudinal 62 adapted to receive screw 38 said element 62 carrying the cross arm 63 terminating in the pad key 61. Also on longitudinal 62 is the spring hook 64 for coaction with needle spring 65 in the customary manner.

Figure 21:
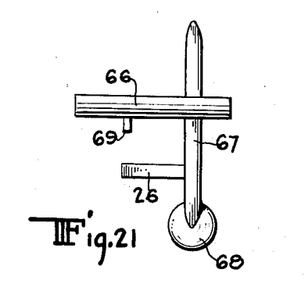
FIG. 21 represents the E or F# pad key.

The E or F# pad key (FIG. 21) comprises the longitudinal 66 and cross arm 67, the latter carrying the pad key 68 and adjusting bar 26. Also on longitudinal 66 is the spring hook 69 adapted to operatively engage the needle spring 48 to return the released key to its original position. Screw 38 passes through longitudinal 66 to rockably support same thereon.

It will be understood that when reference is made to the usual or customary action of the spring hooks and springs above referred to that this means they serve to hold down keys or return same to their original positions as is required to carry out the objects of our invention. It is also possible that the long screw 38 may be replaced by any suitable equivalent such as a rod or shaft upon which the several keys may be rockably mounted.

The rocker mechanisms

This mechanism forms an important segment of our invention and has been added, it being noted that there is no mechanism of this description on any standard clarinet.

Figures 9, 10, 11, 12, 13, 14, 15:
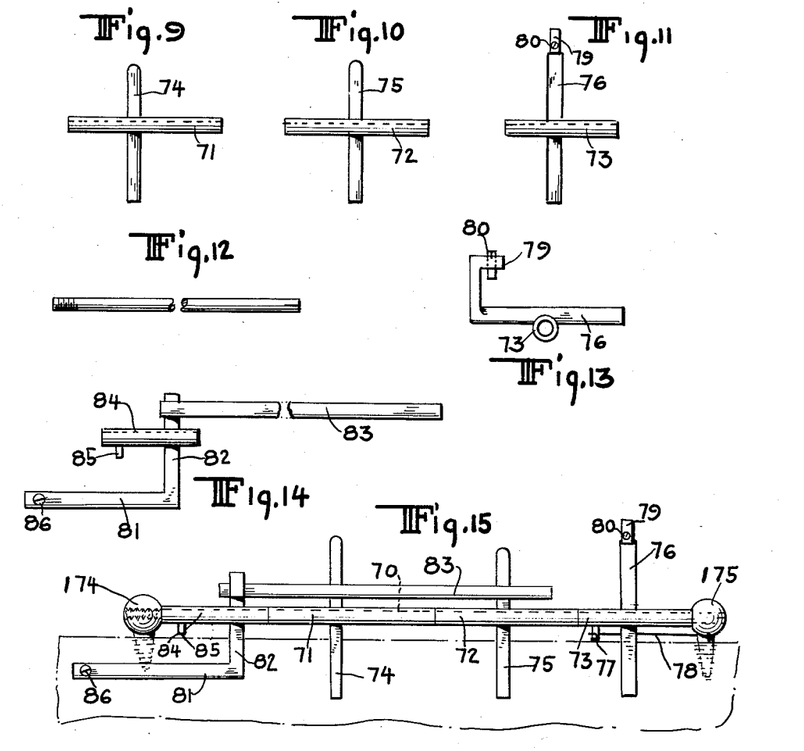
FIG. 9 represents the G# rocker.
FIG. 10 represents the A rocker.
FIG. 11 represents the B flat rocker.
FIG. 12 represents the rocker screw.
FIG. 13 represents the B flat rocker in side elevation.
FIG. 14 represents the F thumb holding key or rocker key.
FIG. 15 represents the assembly of the F thumb holding key, and the G# rocker, A rocker and B flat rocker.

Our rocker mechanism is illustrated in its assembled condition in FIG. 15 and comprises the following: G# rocker including longitudinal 71, A including longitudinal rocker 72 and B flat rocker including longitudinal 73, plus the F thumb holding key 81 or rocker key.

Figure 16:
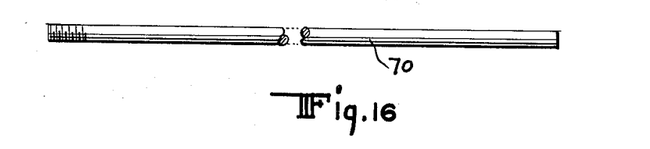
FIG. 16 represents the screw for holding the assembly of FIG. 15 in operative relationship.

The rocker screw 70 (FIG. 16) passes through said key longitudinals 71, 72, 73 and is itself mounted in post tops 174, 175 to serve as the pivot about which the said G#, A and B flat rockers swing. At right angles to longitudinals 71, 72, and 73 are the arms 74, 75, and 76, it being noted that on the B flat rocker key longitudinal 73, there is provided a spring hook 77 for cooperation with needle spring 78. It will also be seen that on the latter key (B flat) there is a short arm 79 carrying a screw 80 in one end thereof. This screw is for adjusting the degree of motion possible between the B flat ring key extension 23 and the B flat rocker extension thereunder. This screw provides the lost motion between these two parts which may be desirable to eliminate bubble or bounce or a third tone which is not necessary.

The needle spring 78 provides a holding down action for the B flat rocker key.

The F thumb holding key (FIG. 14) comprises the longitudinal arm 81, right angled extension 82, and second longitudinal 83. On extension 82, between the longitudinals 81 and 83, is cross member or tube 84 adjacent post top 74, said member 84 sometimes carrying a spring hook 85. In the end of longitudinal 81 is a screw 86 which is located to provide fine adjustment between the F thumb ring key 81, G# pad key 51 and A pad key 56 in relation to their closing action which may be affected by wear or swell of the cork or closing surface of said last two keys mentioned above.

Standard keys on upper section

In addition to the above keys and their operative construction herein ably set forth, the upper section of the instrument carries the following standard keys i.e., standard "speaker" key, B flat side pad key (may also be D# or E flat, B flat or A#).

On the other side, right or left, are, as the case may be (two of each) B flat or A#, and D# or E flat. Also there will be the second key used with the right side key which plays F# with the thumb depressed, plus C# or G# side keys and the standard F thumb trill key.

Figure 23:
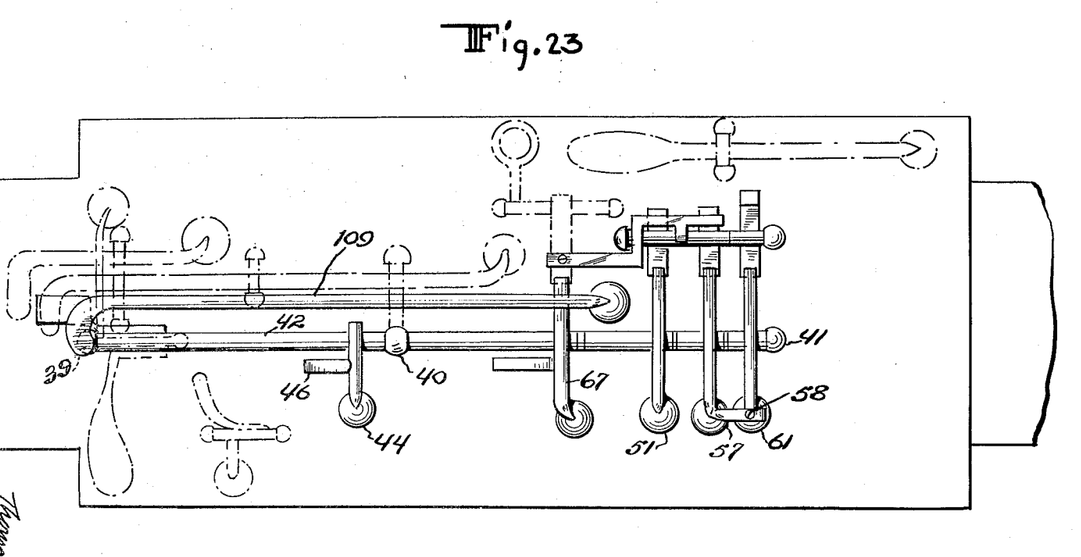
FIGS. 23 and 24 represent a spread view showing the key relationship of the "lower stack" and "top stack" with standard keys (dotted).
Figure 24:
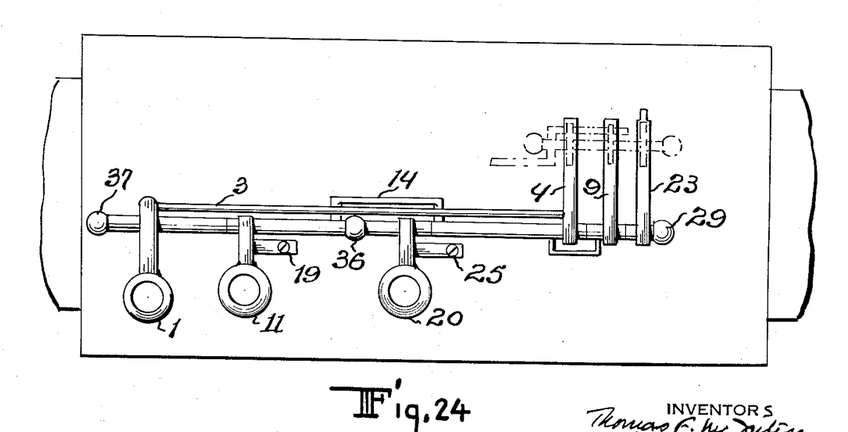
Figure 25:
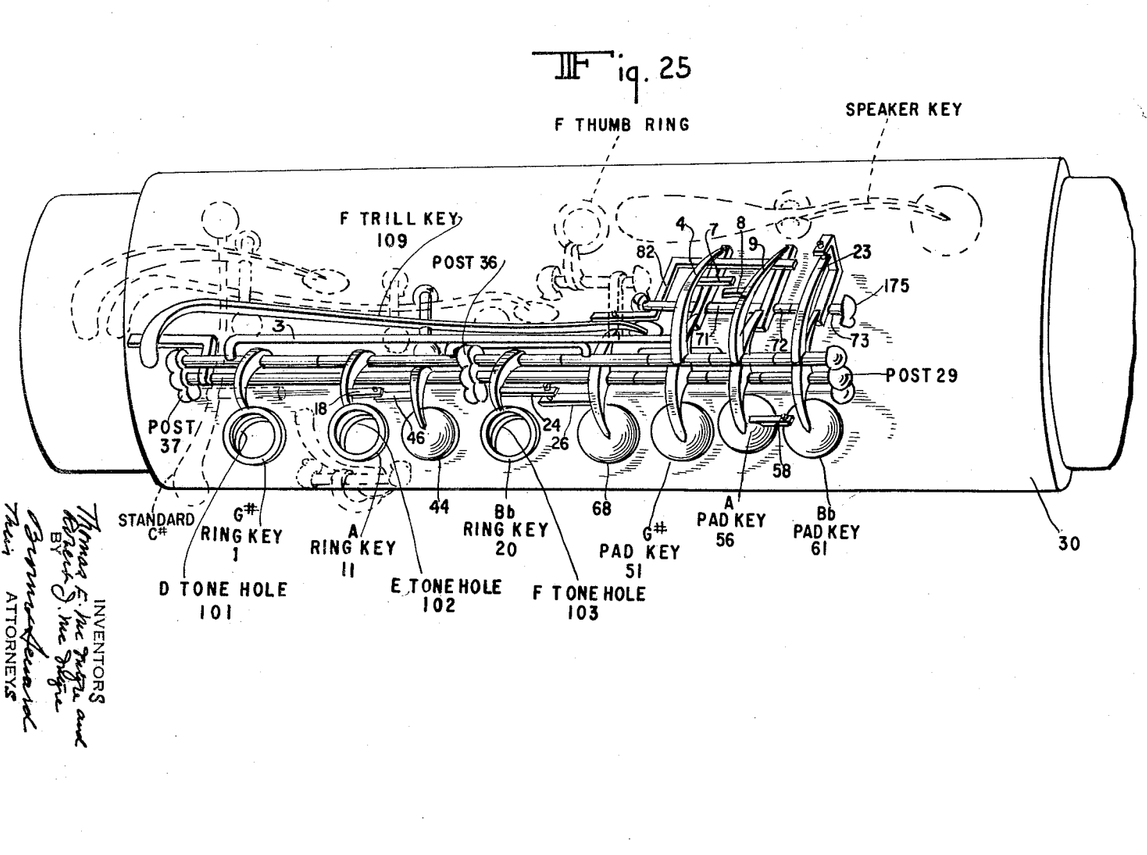
FIG. 25 is an enlarged side view of a clarinet upper section constructed according to our invention showing the relationship of tone holes, rings and pads plus the F trill key.

The standard keys shown in dotted outline in the layout constituting FIG. 23 have now been given numerals and are shown to emphasize the locations of same with respect to the keys principally involved in our invention.

Figure 1:
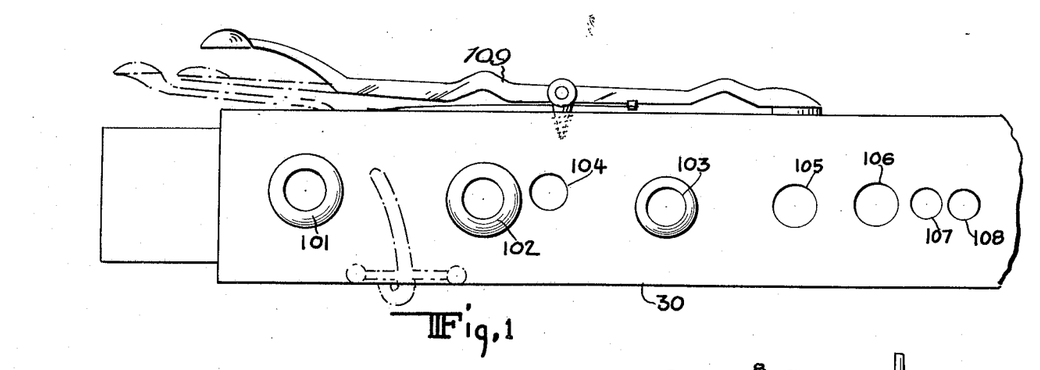
FIG. 1 represents a layout of the upper section of the instrument with the requisite number of holes arranged according to our invention.

Referring to FIG. 1 it will be noted that the upper section 30 is provided with the required holes 101, 102 and 103 conventionally known as D, E and F tone holes, under ring keys 1, 11, and 20 respectively; plus holes 104, 105, 106 under the pads of keys 44, F# 68 and G# 51 respectively, plus holes 107 and 108 for pad key A 56 and B flat 61. It is a feature of our invention that all the said holes are arranged substantially along the same longitudinal axis in the body 30.

It will be noted further that the G# finger hole 101 (conventionally known as the D tone hole) is now raised and provides a flat surface for the fourth finger of the left hand.

The supporting posts 112, 113, 114 for the upper and lower stacks have now been made so that each has three enlarged sections for carrying the pivots or securing means for the several keys and said posts may be affixed to the body in any well known or approved manner.

With respect to the remaining parts of the instrument, they are as in the standard clarinet with no changes having been made in either the lower section (bell end) or the mouth piece, our invention having been directed to the "upper" section only.

Since it is evident that various changes may be made in the form, construction and arrangement of the several parts, we do not intend to be limited to the particular embodiments herein shown and described except as set forth in the appended claims.

What we claim is:

1. A clarinet including an upper section to be fingered principally by the left hand, said section having the conventional D, E, and F tone holes, said section having G♯, A and B♭ tone holes in substantial alignment with said first mentioned tone holes, rings associated with said D, E, and F tone holes, pads associated with said G♯, A and B♭ tone holes and operative connections between said D hole ring and said G♯ hole pad, said E hole ring and said A hole pad and said F hole ring and said B♭ hole pad, whereby G♯ may be played by merely placing a finger on and depressing the D hole ring; A may be played by additionally placing a finger on and depressing the E hole ring and B♭ may be played by additionally placing a finger on and depressing the F hole ring.

2. A structure according to claim 1 in which A may be played by depressing the E hole ring only without the use of any other fingers.

3. A structure according to claim 1 in which B♭ may be played by depressing the E hole ring and the F hole ring.

4. A structure according to claim 1 in which the keys are arranged in upper and lower stacks, plus rocker mechanisms distinct from but adapted to cooperate with said upper and lower stacks and means for supporting said stacks and rocker mechanisms in superposed relationship on said upper section.

5. A clarinet including an upper section to be fingered by the left hand, said section having the conventional D, E, and F tone holes, said section having G♯, A and B♭ tone holes in substantial alignment with said first mentioned tone holes, rings associated with said D, E, and F tone holes, pads associated with said G♯, A and B♭ tone holes and operative connections between said D hole ring and said G♯ hole pad, said E hole ring and said A hole ring and said F hole ring and said B♭ hole pad, said operative connection comprising rocker mechanisms distinct from but adapted for cooperation with said keys, whereby G♯ may be played by merely placing a finger on and depressing the D hole ring; A may be played by additionally placing a finger on and depressing the E hole ring and B♭ may be played by additionally placing a finger on and depressing the F hole ring.

6. A structure according to claim 5 wherein the keys are arranged in superposed stacks, the top stack of keys comprising G♯, A and B♭ ring key mechanism.

7. A structure according to claim 5 in which said keys are arranged in superposed stacks, the lower stack of keys comprising D, E or F♯, G♯, A and B♭ pad key mechanisms.

8. A combination according to claim 5 in which the keys are arranged in upper and lower stacks which are in superposed relationship together with the rocker mechanisms comprising G♯, A, B♭ and F thumb holding key rockers.

9. A structure according to claim 5 having a B♭ rocker in which the parts are so constructed and arranged that there is appreciable lost motion in the B♭ rocker to eliminate unintentional tone movement of said rocker.

10. A structure according to claim 1 including an F thumb key and a F♯ pad key wherein the F♯ ring is split horizontally whereby it may be operated independently with either the F thumb key or with the F♯ pad key.

11. A structure according to claim 1 in which the keys are arranged in a top stack, a lower stack plus cooperating rocker mechanisms for said stacks wherein at least one of the keys of the upper stack is provided with means for limiting its motion with respect to at least one key of the lower stack and at least one key of the lower stack is provided with means for limiting its movement with respect to at least one other key in the lower stack.

12. A structure according to claim 1 including an F trill key located on said upper section whereby the F to G trill may be played by depressing said F trill key normally with the index finger of the right hand.

References Cited in the file of this patent

UNITED STATES PATENTS

| | | |
|---|---|---|
| 527,742 | Devault | Oct. 16, 1894 |
| 1,235,394 | Sternberg | July 31, 1917 |
| 2,171,624 | De Marco | Sept. 5, 1939 |
| 2,183,423 | Christensen | Dec. 12, 1939 |
| 2,214,089 | Stover | Sept. 10, 1940 |
| 2,867,146 | Mazzeo | Jan. 6, 1959 |

UNITED STATES PATENT OFFICE
CERTIFICATE OF CORRECTION

Patent No. 3,015,981                      January 9, 1962

Thomas F. McIntyre et al.

It is hereby certified that error appears in the above numbered patent requiring correction and that the said Letters Patent should read as corrected below.

Column 7, line 32, for "ring", first occurrence, read -- pad --.

Signed and sealed this 8th day of May 1962.

(SEAL)
Attest:

ERNEST W. SWIDER
Attesting Officer

DAVID L. LADD
Commissioner of Patents